United States Patent
Kai et al.

(10) Patent No.: US 9,416,892 B2
(45) Date of Patent: Aug. 16, 2016

(54) ELECTROMAGNETIC VALVE

(71) Applicant: Nidec Tosok Corporation, Zama-shi, Kanagawa (JP)

(72) Inventors: Fumio Kai, Zama (JP); Tomohiro Yasuda, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 71 days.

(21) Appl. No.: 14/517,955

(22) Filed: Oct. 20, 2014

(65) Prior Publication Data

US 2015/0129785 A1 May 14, 2015

(30) Foreign Application Priority Data

Nov. 11, 2013 (JP) ................................ 2013-233523

(51) Int. Cl.
*F16K 31/06* (2006.01)
*F16K 31/08* (2006.01)

(52) U.S. Cl.
CPC ........... *F16K 31/082* (2013.01); *F16K 31/0631* (2013.01)

(58) Field of Classification Search
CPC .......................... F16K 31/082; F16K 31/0631
USPC ........ 251/65, 129.02, 129.14, 129.15, 129.17
See application file for complete search history.

(56) References Cited

U.S. PATENT DOCUMENTS

| | | | | |
|---|---|---|---|---|
| 3,379,214 A * | 4/1968 | Weinberg | ............... | F16K 31/082 137/625.5 |
| 4,635,683 A * | 1/1987 | Nielsen | ..................... | H01F 7/13 137/625.65 |
| 4,682,135 A * | 7/1987 | Yamakawa | ............ | H01F 7/1638 335/230 |
| 4,838,518 A * | 6/1989 | Kobayashi | ......... | G05D 16/2013 137/625.65 |
| 4,988,074 A * | 1/1991 | Najmolhoda | ...... | G05D 16/2013 251/129.08 |
| 5,513,832 A * | 5/1996 | Becker | ................ | F16K 31/0624 137/82 |
| 5,718,264 A * | 2/1998 | Sturman | ............. | F15B 13/0405 137/625.65 |
| 6,019,120 A * | 2/2000 | Najmolhoda | ....... | F16K 31/0631 137/625.61 |
| 6,299,130 B1 * | 10/2001 | Yew | ................... | F02M 25/0772 251/129.15 |
| 6,932,316 B2 * | 8/2005 | Herbert | ..................... | F16K 7/14 251/129.07 |
| 8,505,573 B2 * | 8/2013 | Herbert | ............... | F16K 31/1672 137/554 |

FOREIGN PATENT DOCUMENTS

| | | |
|---|---|---|
| JP | 08-110126 A | 4/1996 |
| JP | 2002-213634 A | 7/2002 |
| JP | 2002-250457 A | 9/2002 |

* cited by examiner

*Primary Examiner* — Matthew W Jellett
(74) *Attorney, Agent, or Firm* — Keating & Bennett, LLP

(57) ABSTRACT

An electromagnetic valve includes a pressing member fixed farther towards an electromagnetic movable section side than a valve chamber in a nozzle. The pressing member is fixed to a plunger farther towards the side where the plunger is pressed by the pressing member than a position where the pressing member is fixed to the nozzle. Thus, a magnetic circuit defined by magnetic flux that is generated from a magnet is prevented from being located at a portion not related to an attractive force between a core and the plunger such that it is possible to effectively utilize the magnetic flux as an attractive force between the core and the plunger.

14 Claims, 9 Drawing Sheets

ELECTROMAGNETIC VALVE

BACKGROUND OF THE INVENTION

1. Field of the Invention

The present invention relates to an electromagnetic valve which is operated by an electrical signal.

2. Description of the Related Art

In the related art, a latch type electromagnetic coil which efficiently opens and closes a pathway of a fluid is known. For example, in Japanese Unexamined Patent Application Publication No. 2002-250457, a latch type electromagnetic coil is described in which a biasing member made of a coil spring or the like, which biases a plunger in a direction away from an attractor, is interposed between the plunger and the attractor.

In recent years, a reduction in power consumption has been strongly required for electrical products, and therefore, the same demand has also increased for electromagnetic valves which are operated by an electrical signal. Above all, a latch type electromagnetic valve which is energized only at the time of opening or closing and in which the state is maintained after the opening and the closing, even if energization is cut off, is very effective in terms of power consumption among electromagnetic valves, and thus demand therefor is increasing.

In this regard, in the latch type electromagnetic coil of Japanese Unexamined Patent Application Publication No. 2002-250457, valve opening is performed by attracting the plunger to the attractor by energizing a coil member so as to generate magnetic flux in the same direction as the magnetic flux of a permanent magnet, and after the valve opening, the attractive force of the permanent magnet is set so as to maintain a valve opening position due to being set to be stronger than that of the biasing member even if the energization is cut off. Further, setting is made such that the plunger is separated from the attractor by energizing the coil member so as to generate magnetic flux in the opposite direction to the magnetic flux of the permanent magnet, whereby valve closing is performed. Further, a biasing force from the biasing member in a direction in which the plunger is separated from the attractor is made larger than an attractive force from the permanent magnet, whereby a valve closing state is maintained.

However, in the latch type electromagnetic coil of Japanese Unexamined Patent Application Publication No. 2002-250457, the biasing member is disposed between the plunger and the attractor. Further, the biasing member is disposed so as to be accommodated in an external box member made of a magnetic member and having a substantially U-shaped cross-section. For this reason, since the biasing member is accommodated in the external box member, it is necessary to make the plunger very large, and as a result, the size of an electromagnetically operated coil is increased.

SUMMARY OF THE INVENTION

According to an exemplary preferred embodiment of the present invention, an electromagnetic valve includes an electromagnetic movable section; and a nozzle, wherein the electromagnetic movable section includes a coil which is configured by winding a conducting wire around a bobbin around a central axis of extending in an up-and-down direction, a plunger which is directly or indirectly supported with respect to the coil so as to be movable in the up-and-down direction along the central axis radially inside the coil, protrudes to the nozzle side, and includes a magnetic body portion, a core which is fixed to an inside in a radial direction of the coil, is disposed to face the magnetic body portion of the plunger in a direction of the central axis, and is a magnetic body, a cover including a cylindrical portion which covers the coil from an outside in the radial direction and is a magnetic body, and an annular magnet configuring a magnetic circuit between the core, the plunger, and the cover, the nozzle is disposed axially below the electromagnetic movable section and includes an inlet-port, an outlet-port, a valve coming into contact with a lower end portion in an axial direction of the plunger, and a valve chamber accommodating the valve, the inlet-port communicates with the valve chamber, the outlet-port communicates with the valve chamber in a direction different from the inlet-port, the valve moves in the axial direction in the valve chamber, thereby performing opening and closing between the inlet-port and the valve chamber, a pressing member is fixed farther towards the electromagnetic movable section side than the valve chamber in the nozzle, and the pressing member is fixed to the plunger at a position farther towards a side where the plunger is pressed by the pressing member than a position where the pressing member is fixed to the nozzle.

According to the exemplary preferred embodiment of this application, since the pressing member is disposed below the electromagnetic movable section, the size of the electromagnetic movable section is significantly reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 5:
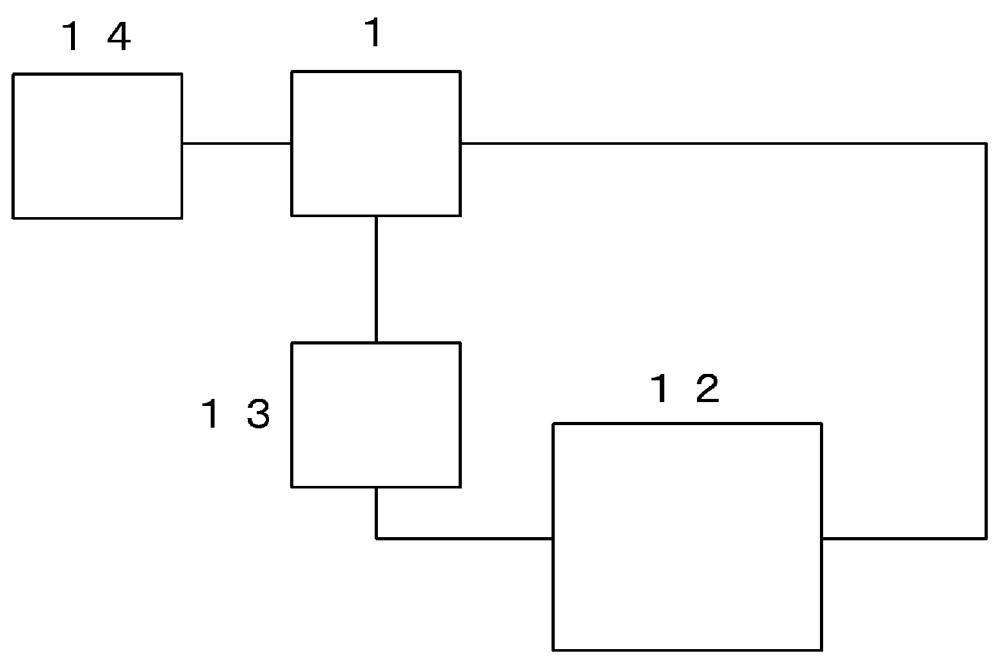
FIG. 5 is a conceptual diagram showing a pathway of a fluid when an electromagnetic valve of preferred embodiments of the present invention is used.

As shown in FIG. 5, an electromagnetic valve 1 according to preferred embodiments of the present invention is disposed to be connected to a fluid reservoir 12, a pressurizing device 13, and a pressurized device 14 such that a fluid can move therebetween. The electromagnetic valve 1 preferably includes an inlet-port 35 which communicates with the pressurizing device 13, an outlet-port 36 which communicates with the pressurized device 14, and a drain port 37 which communicates with the fluid reservoir 12, as shown, for example, in FIG. 1. In a valve opening state, the electromagnetic valve 1 makes the inlet-port 35 and the outlet-port 36 communicate with each other and closes a flow path to the drain port 37. Further, in a valve closing state, the electromagnetic valve 1 makes the outlet-port 36 and the drain port 37 communicate with each other and closes a flow path from the inlet-port 35.

A fluid which is present in the fluid reservoir 12 is pressurized through the pressurizing device 13. In this way, a flow path between the pressurizing device 13 and the electromagnetic valve 1 enters a pressurized state. At this time, the electromagnetic valve 1 is in a valve opening state, such that the inlet-port 35 and the outlet-port 36 communicate with each other, and thus it is possible to pressurize the pressurized device 14. The pressurized device 14 is preferably operated in this manner. If an operation in the pressurized device 14 is completed, the electromagnetic valve 1 is in a valve closing state, such that a flow path to the inlet-port 35 is closed and the outlet-port 36 and the drain port 37 are made to communicate with each other. In this way, fluid will be directed into the fluid reservoir 12 and a flow path between the pressurized device 14 and the electromagnetic valve 1 is depressurized.

Hereinafter, exemplary preferred embodiments of the present invention will be described with reference to the drawings. In addition, in the following description, a direction along a central axis X of a plunger will be referred to as an "axial direction", and a direction orthogonal or substantially orthogonal to the central axis X will be referred to as a "radial direction". Further, in the following description, the shape of each section or the positional relationship between the respective sections will be described with the axial direction being an up-and-down direction. However, the definition of the up-and-down direction or the like is not intended to limit a direction at the time of manufacture and use of the electromagnetic valve according to preferred embodiments of the present invention.

Further, in the following description, a "parallel" direction includes both parallel and substantially parallel directions. Additionally, in the following description, an "orthogonal" direction includes both orthogonal and substantially orthogonal directions.

Figure 1:
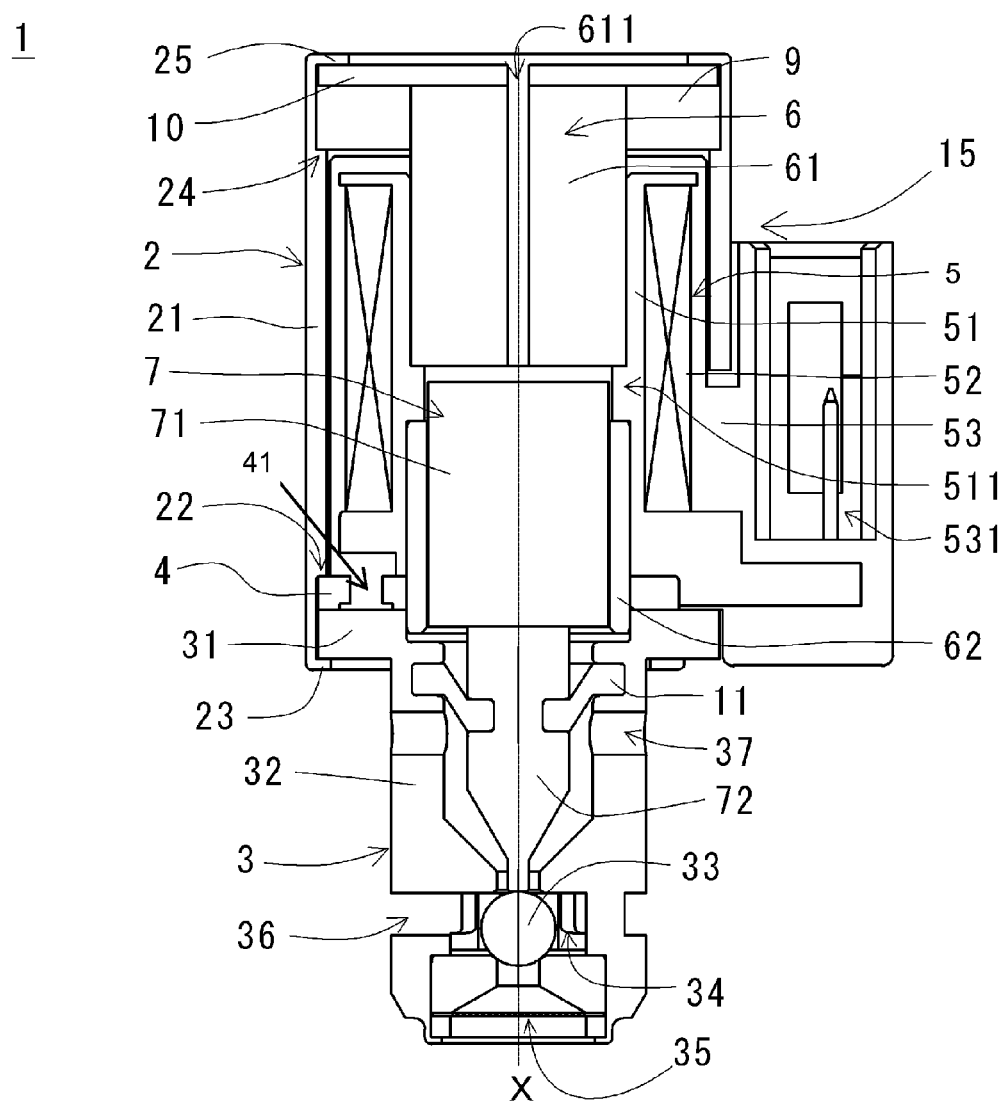
FIG. 1 is a cross-sectional view in a valve closing state of an electromagnetic valve according to a first preferred embodiment of the present invention.
Figure 2:
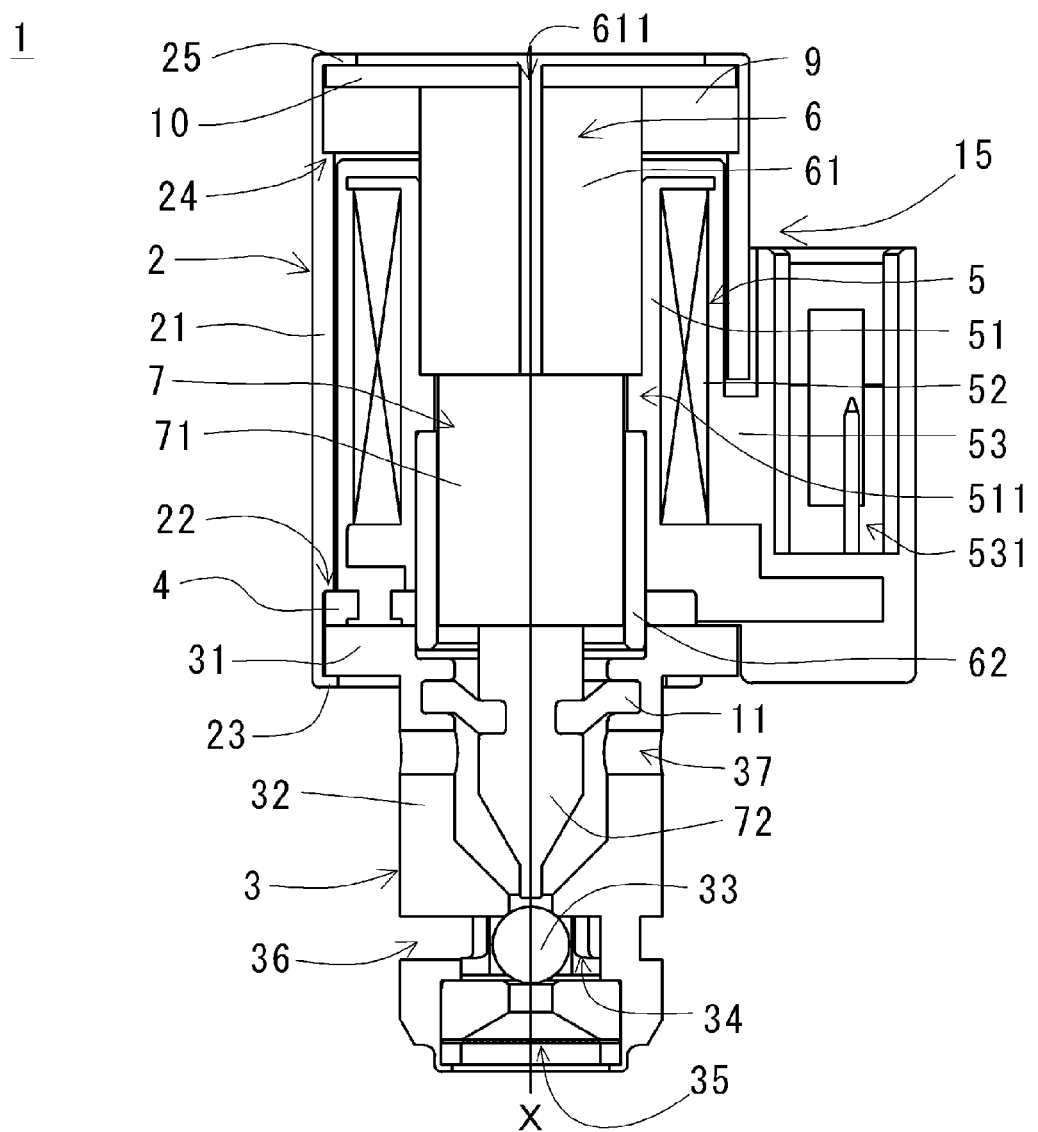
FIG. 2 is a cross-sectional view in a valve opening state of the electromagnetic valve according to the first preferred embodiment of the present invention.

FIGS. 1 and 2 are cross-sectional views of the electromagnetic valve 1 according to a first preferred embodiment of the present invention. The electromagnetic valve 1 is a preferably device which moves a plunger 7 in the up-and-down direction. FIG. 1 shows the electromagnetic valve 1 in a valve closing state, and FIG. 2 shows the electromagnetic valve 1 in a valve opening state.

As shown in FIG. 1, the electromagnetic valve 1 according to the first preferred embodiment includes an electromagnetic movable section 15 and a nozzle 3. The electromagnetic movable section 15 preferably includes a cover 2, a yoke 4, a solenoid 5, a core 6, the plunger 7, a magnet 9, and a cap 10.

The cover 2 of the electromagnetic valve 1 preferably includes a cylindrical portion 21 which is a magnetic body and which covers a coil 52 from the outside in the radial direction. The nozzle 3 is provided at a lower end portion of the cover 2. The nozzle 3 preferably includes a disk portion 31, a nozzle portion 32, and a valve 33. The disk portion 31 extends radially outward from an upper end of the nozzle portion 32. Further, a radially outer end of the disk portion 31 is fixed to the inner peripheral surface of the cover 2. The nozzle portion 32 preferably includes a valve chamber 34 which accommodates the valve 33, and the inlet-port 35, the outlet-port 36, and the drain port 37, which communicates with the valve chamber 34. The inlet-port 35 is an inflow port of a fluid and is configured so as to provide a space on the lower side of the nozzle portion 32 and the valve chamber 34 communicate with each other. The lower side of the inlet-port 35 is preferably connected to, for example, a pump including a fluid having high pressure retained therein. For this reason, in the valve closing state, the valve 33 enters a state of being pressed axially upward by the fluid. The outlet-port 36 is an outflow port of a fluid and is configured so as to make the outside in the radial direction of the nozzle portion 32 and the valve chamber 34 communicate with each other. The drain port 37 is configured so as to make the outside in the radial direction of the nozzle portion 32 and the valve chamber 34 communicate with each other farther towards the upper side than the outlet-port 36. The drain port 37 is used as a moving destination of a fluid with high pressure maintained therein in the vicinity of the outlet-port 36 when a change from the valve opening state to the valve closing state is made, and a fluid moves to the drain port 37 side, such that the pressure of the fluid is significantly reduced.

The yoke 4 made of a magnetic body and having an annular shape is preferably disposed on the upper side of the disk portion 31. The yoke 4 is preferably held in position by a lower step portion 22 defined on the inner surface of the cover 2. A lower end of the cover 2 is bent inward so as to define a lower caulking portion 23. In this way, the yoke 4 and the disk portion 31 are sandwiched between the lower step portion 22 and the lower caulking portion 23.

The solenoid 5 is preferably disposed on the upper side of the yoke 4. The solenoid 5 preferably includes a bobbin 51, the coil 52, and a mold 53. The bobbin 51 is a cylindrical member. The coil 52 is preferably configured by winding a conducting wire about the bobbin 51 around the central axis X extending in the up-and-down direction. The core 6 is disposed radially inside the bobbin 51. The core 6 preferably includes an attractor 61 and a bush 62. The attractor 61 and the bush 62 are fixed to the inner periphery of the bobbin 51. More specifically, the attractor 61 is preferably fixed farther towards the upper side than a convex portion 511 provided on the inner peripheral surface of the bobbin 51 and protruding radially inward. The bush 62 is fixed farther towards the lower side than the convex portion 511. Further, the attractor 61 comes into contact with the upper surface of the convex portion 511, and the bush 62 comes into contact with the lower surface of the convex portion 511, to thus be positioned in the axial direction. In other words, the core 6 includes a cylindrical portion which is fixed to the inside in the radial direction of the coil 52, is disposed to face a magnetic body portion 71 of the plunger 7 and the central axis X, and supports the plunger 7 so as to be movable along the central axis X. The cylindrical portion corresponds to the bush 62. Further, the yoke 4 is disposed radially outside the bush 62 so as to come into contact with the outer peripheral surface of the bush 62.

The bobbin 51 and the coil 52 are preferably covered with the mold 53. The yoke 4 includes a fixing hole 41. The yoke 4 is covered with the mold 53 through insert resin molding, for example, together with the coil 52 and the bobbin 51. At that time, a portion of the mold 53 enters the fixing hole 41 such that the yoke 4 does not easily detach from the mold 53.

The plunger 7 is disposed radially inside the bush 62 so as to be movable in the up-and-down direction along the central axis X. The plunger 7 preferably includes the magnetic body portion 71 made of a magnetic body, and a pin 72 made of a nonmagnetic body. The pin 72 is fixed to a lower end portion of the magnetic body portion 71. Further, the pin 72 is inserted into the nozzle portion 32. A lower end portion of the pin 72 is in contact with the valve 33 in the valve closing state. In other words, the plunger 7 is disposed radially inside the coil 52 so as to be movable in the up-and-down direction along the central axis X.

A pressing member 11 is preferably disposed between the nozzle portion 32 and the pin 72. The pressing member 11 presses the pin 72 axially downward. Further, the pressing member 11 presses the plunger 7 farther towards the lower side in the axial direction than a position where the pressing member 11 is fixed to the nozzle 3. Further, the pressing member 11 is fixed to the plunger 7 farther towards the side where the plunger 7 is pressed by the pressing member 11 than a position where the pressing member 11 is fixed to the nozzle 3. More specifically, the pressing member 11 is fixed to the pin 72 at a location farther towards the side where the pin 72 is pressed by the pressing member 11 than a position where the pressing member 11 is fixed to the nozzle portion 32. In this way, the movement of a fluid to the electromagnetic movable section 15 is prevented and maintenance of a state in the valve closing state becomes possible. Further, the pressing member 11 is fixed to the plunger 7 at a position farther towards the side where the plunger 7 is pressed by the pressing member 11 than a position where the pressing member 11 is fixed to the nozzle 3, such that the pressing member 11 more strongly presses the plunger 7, compared to a case where a position where the pressing member 11 is fixed to the nozzle 3 side and a position where the pressing member 11 is fixed to the plunger 7 side are the same in the axial direction. The pressing member 11 is preferably, for example, a diaphragm. Further, the position where the pressing member 11 is fixed to the nozzle 3 side is positioned farther towards the upper side than the drain port 37. In other words, the nozzle 3 includes the drain port 37 penetrating farther radially outward farther towards the valve chamber 34 side than a location to which the pressing member 11 is fixed.

The magnet 9 having an annular shape is disposed above the solenoid 5. Further, the magnet 9 is disposed between the attractor 61 and the cover 2 and is subjected to one-sided single-pole magnetization in the radial direction such that, for example, the inside in the radial direction becomes an N pole and the outside in the radial direction becomes an S pole.

The magnet 9 is located in the axial direction by an upper step portion 24 provided on the inner surface of the cover 2. The disk-shaped cap 10 including a nonmagnetic body is disposed on the upper sides of the magnet 9 and the attractor 61. An upper end of the cover 2 is bent inward, thus defining an upper caulking portion 25. In this way, the magnet 9 and the cap are sandwiched between the upper step portion 24 and the upper caulking portion 25. The upper caulking portion 25 preferably extends radially inward from an upper end of the cylindrical portion 21 of the cover 2, but, does not extend to a position axially overlapping with the attractor 61. In this way, a magnetic circuit between the magnet 9 and the upper caulking portion 25 is prevented from being located above the magnet 9. Further, the upper caulking portion 25 does not extend to a position axially overlapping with a plane which is perpendicular or substantially perpendicular to a straight line connecting the N pole and the S pole of the magnet 9 and passes through a central position between the N pole and the S pole. In this way, a magnetic circuit between the magnet 9 and the upper caulking portion 25 is further prevented from being located above the magnet 9.

One end of the coil 52 is preferably electrically connected to a connector 531 provided at the bobbin 51. Further, the cover 2 is preferably cut out toward the upper side in the axial direction from the lower side in the axial direction at a position corresponding to the connector 531, and the connector 531 is fitted into the cut-out portion.

In the electromagnetic valve 1 shown in FIG. 1 and FIG. 2 (described later), magnetic flux which is generated from the N pole on the inside in the radial direction of the magnet 9 passes through the attractor 61, the magnetic body portion 71, the bush 62, the yoke 4, and the cover 2, such that a magnetic circuit reaching the S pole on the outside in the radial direction of the magnet 9 is provided. In other words, the magnet 9 configures a magnetic circuit between the core 6, the plunger 7, and the cover 2.

That is, the magnet 9 is subjected to one-sided single-pole magnetization along the magnetic circuit, and the plane which is perpendicular or substantially perpendicular to a straight line connecting the N pole and the S pole and passes through a central position between the N pole and the S pole is disposed so as not to pass through the core 6, and therefore, it is possible to prevent a magnetic circuit other than the above-described magnetic circuit from being provided. In this way, the magnetic flux which is generated from the N pole of the magnet 9 can be effectively utilized as a force to attract the magnetic body portion 71 of the plunger 7 to the attractor 61.

Further, the pressing member 11 presses the plunger 7 relative to the core 6 in a direction repelling a force by which the magnetic body portion 71 of the plunger 7 is magnetically attracted to the core 6, due to the influence of the magnetic flux of the magnet 9.

As in the electromagnetic valve 1 in FIG. 1, in the valve closing state, the distance between the attractor 61 and the magnetic body portion 71 preferably is a distance in which the magnetic attractive force between the attractor 61 and the magnetic body portion 71 becomes smaller than the pressing force of the pressing member 11, and therefore, it is possible to maintain the valve closing state without energizing the coil.

The electromagnetic valve 1 in FIG. 2 shows a valve opening state. In the valve opening state, the distance between the attractor 61 and the magnetic body portion 71 preferably is a distance in which the magnetic attractive force between the attractor 61 and the magnetic body portion 71 becomes larger than the pressing force of the pressing member 11, and therefore, it is possible to maintain the valve opening state without energizing the coil 52. In the valve opening state, the axially upper surface of the magnetic body portion 71 is in contact with the lower surface of the attractor 61.

According to the structure of the electromagnetic valve 1 related to the first preferred embodiment, it is possible to maintain the valve closing state and the valve opening state without energization. Further, in a case where a change from the valve closing state to the valve opening state is made, it is only necessary to energize the coil 52 such that magnetic flux in the same direction as the magnetic flux which is generated from the magnet 9 is generated. If the magnetic flux in the same direction as the magnetic flux which is generated from the magnet 9 is generated by energizing the coil 52, the magnetic attractive force between the attractor 61 and the magnetic body portion 71 becomes larger than the pressing force of the pressing member 11, such that the plunger 7 moves axially upward. Then, the valve is pushed by the pressure of a fluid on the inlet-port side, thus moving axially upward, such that the valve opening state is created. Further, as described above, in the valve opening state, even after the energization of the coil 52 is stopped, the state is maintained.

Further, in a case where a change from the valve opening state to the valve closing state is performed, it is only necessary to energize the coil 52 such that magnetic flux in the opposite direction to the magnetic flux which is generated from the magnet 9 is generated. If the magnetic flux in the opposite direction to the magnetic flux which is generated from the magnet 9 is generated by energizing the coil 52, the magnetic attractive force between the attractor 61 and the magnetic body portion 71 becomes weaker than the pressing force of the pressing member 11, such that the plunger 7 moves axially downward along with the valve 33. In this way, the valve closing state is created. Further, as described above, in the valve closing state, even after the energization of the coil 52 is stopped, the state is maintained.

The attractor 61 preferably includes a spiracle 611 penetrating in a direction along the central axis X. The cap 10 which is disposed on the upper side of the attractor 61 also preferably includes a hole penetrating in a direction along the central axis X. For this reason, a space above the electromagnetic valve 1 and a space of a concave portion (abbreviated in the figure) in the top surface of the magnetic body portion 71 communicate with each other. In this way, the space inside the concave portion 711 of the magnetic body portion 71 does not become a space closed from the outside, and therefore, it becomes hard for a change in pressure due to the up-and-down movement of the plunger 7 to occur, and thus the opening and closing movement of the valve is not impeded.

The magnet 9 is disposed radially outside the attractor 61, such that, compared to a case where the magnet 9 is disposed radially outside the magnetic body portion 71, the magnetic body portion 71 is prevented from moving in the up-and-down direction with it shifted in the radial direction from the central axis X. That is, this is because the magnetic attractive force between the attractor 61 and the magnetic body portion 71 becomes equal or substantially equal in a case where the magnet 9 is disposed radially outside the attractor 61 and a case where the magnet 9 is disposed radially outside the magnetic body portion 71, but, in terms of a magnetic attractive force to the outside in the radial direction of the magnetic body portion 71, the magnetic attractive force becomes smaller in a case where the magnet 9 is disposed radially outside the attractor 61. The reason is because, in a magnetic circuit, a distance from the magnet 9 to the side surface in the radial direction of the magnetic body portion 71 becomes larger in a case where the magnet 9 is disposed radially outside the attractor 61, compared to a case where the magnet 9 is disposed radially outside the magnetic body portion 71. If the distance from the magnet 9 to the side surface in the radial direction of the magnetic body portion 71 becomes large, it means that a plurality of members are disposed in a magnetic circuit from the magnet 9 to the magnetic body portion 71. Due to the influence of the magnetic reluctance of each member or magnetic reluctance between the respective members, an attractive force in the radial direction to the magnetic body portion 71, which is given by the magnetic flux of the magnet 9, becomes smaller in a case where the magnet 9 is disposed radially outside the attractor 61, compared to a case where the magnet 9 is disposed radially outside the magnetic body portion 71. If the magnetic body portion 71 moves in the up-and-down direction with it shifted in the radial direction from the central axis X, the bush 62 or the magnetic body portion 71 will be shaved by the other structures of the electromagnetic valve 1, and thus there is a concern that contamination may occur. The contamination will be accumulated between the magnetic body portion 71 and the bush 62, thus impeding the movement in the up-and-down direction of the plunger 7. If the movement in the up-and-down direction of the plunger 7 is impeded due to the accumulation of the contamination, the responsiveness of the electromagnetic valve 1 will deteriorate, and in the worst case, the movement will be completely impeded such that functionality of the electromagnetic valve 1 will be lost. In the structure in the first preferred embodiment, such a concern is significantly decreased or prevented.

At least the radially inner surface of the bush 62 is coated. In this way, the movement in the up-and-down direction of the magnetic body portion 71 radially inside the bush 62 is smoothly performed. Further, since a coating made of a nonmagnetic body is present between the bush 62 and the magnetic body portion 71, the distance between the magnetic body portion 71 and the bush 62 is increased such that a magnetic attractive force is weakened. For this reason, the magnetic body portion 71 is further prevented from moving in the up-and-down direction with it shifted in the radial direction from the central axis X.

In the structure in this preferred embodiment, the cap 10 which is disposed on the upper sides of the magnet 9 and the attractor 61 preferably is made of nonmagnetic material. For this reason, formation of a magnetic circuit in which the magnetic flux which is generated from the magnet 9 passes through the cap 10 is prevented. For this reason, it is possible to prevent occurrence of magnetic loss, and thus it is possible to effectively utilize the magnetic flux which is generated from the magnet 9.

Further, preferred embodiments of the present invention relate to an electromagnetic valve which is used in a control valve that is used when applying pressure to, for example, an in-vehicle pressurized device. In the in-vehicle pressurized device, metal contamination is generated and mixed into a fluid. This metal contamination is adsorbed to and accumulated on a magnetized portion. However, since the pin 72 in this preferred embodiment is a nonmagnetic body, there is not such a concern. For this reason, a concern that contamination may be adsorbed, for example, between the pin 72 and the valve 33, thus causing an obstacle in the opening and closing of the valve, is small.

Further, the valve 33 in the first preferred embodiment is preferably made of a nonmagnetic body. For this reason, a concern that contamination may be adsorbed and accumulated between the valve 33 and the pin 72 is much less.

The first preferred embodiment of the present invention has been described above. However, the present invention is not limited to the above-described preferred embodiment.

Figure 6A:
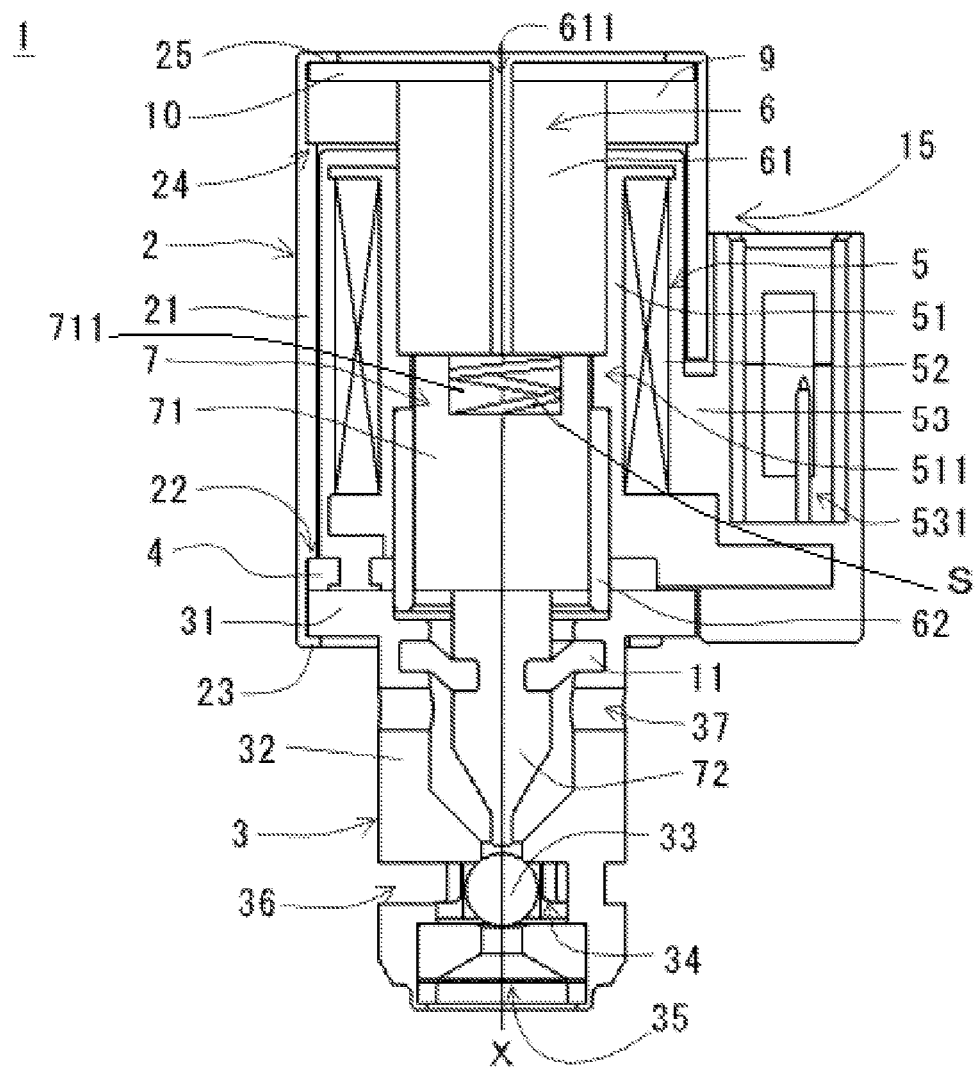
FIGS. 6A and 6B are cross-sectional views of the electromagnetic valve according to another preferred embodiment of the present invention.
Figure 6B:
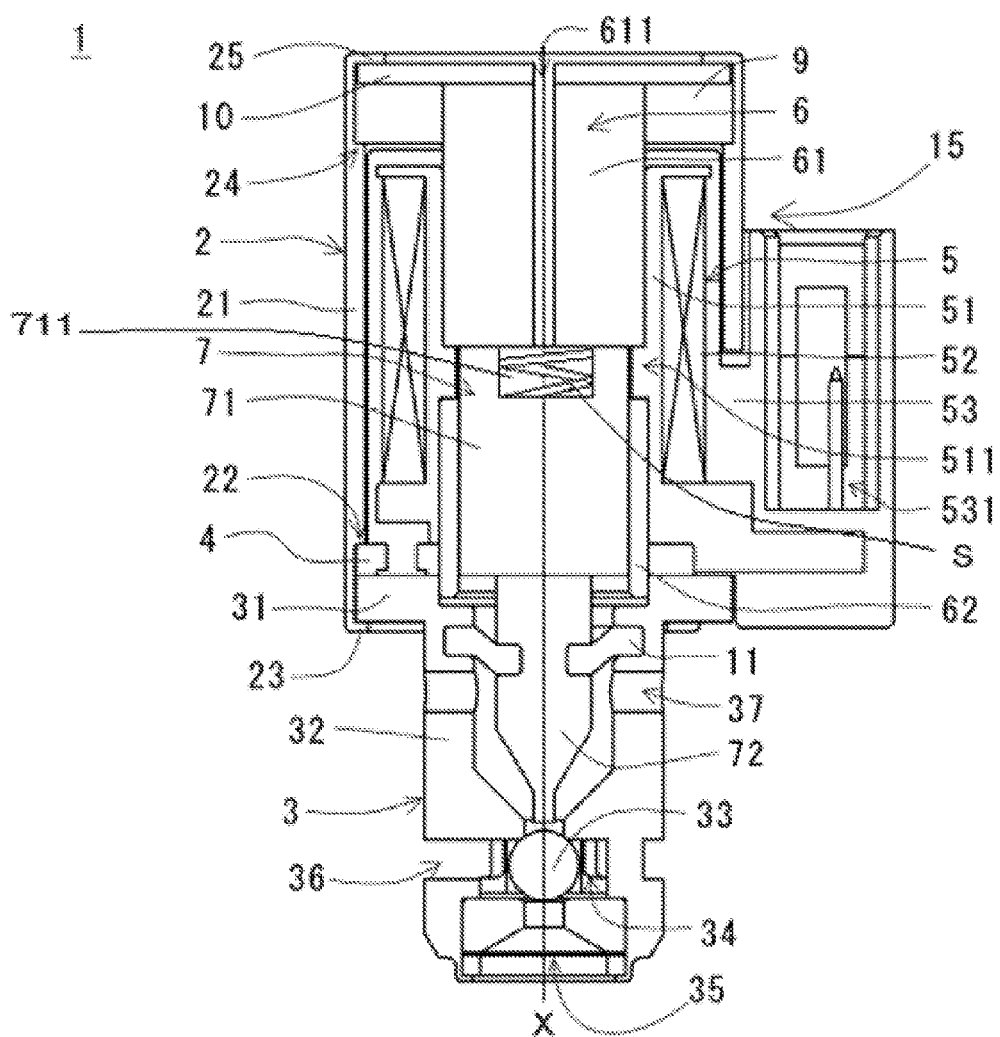

In the first preferred embodiment, the plunger 7 is preferably pressed downward by the pressing member 11. However, in addition to the pressing member 11, a spring (S, as shown in FIGS. 6A and 6B) may also be used, if so desired. In a case where the spring is also used, the spring is preferably disposed in the concave portion 711 of the magnetic body portion 71. The concave portion 711 is an upward opened depression of the magnetic body portion 71. The spring is in contact with each of the bottom surface of the concave portion 711 and the lower surface of the attractor 61. In this way, the magnetic body portion 71 is pressed by the spring in a direction axially away from the attractor 61. If the spring is disposed in this manner and the pressing member 11 and the spring are used together, compared to the related art, a pressing force of the spring can be reduced by the extent that the plunger 7 is pressed by the pressing member 11. As a result, it is possible to make the spring small, and thus a reduction in the size of the electromagnetic movable section 15 is attained.

Figure 3:
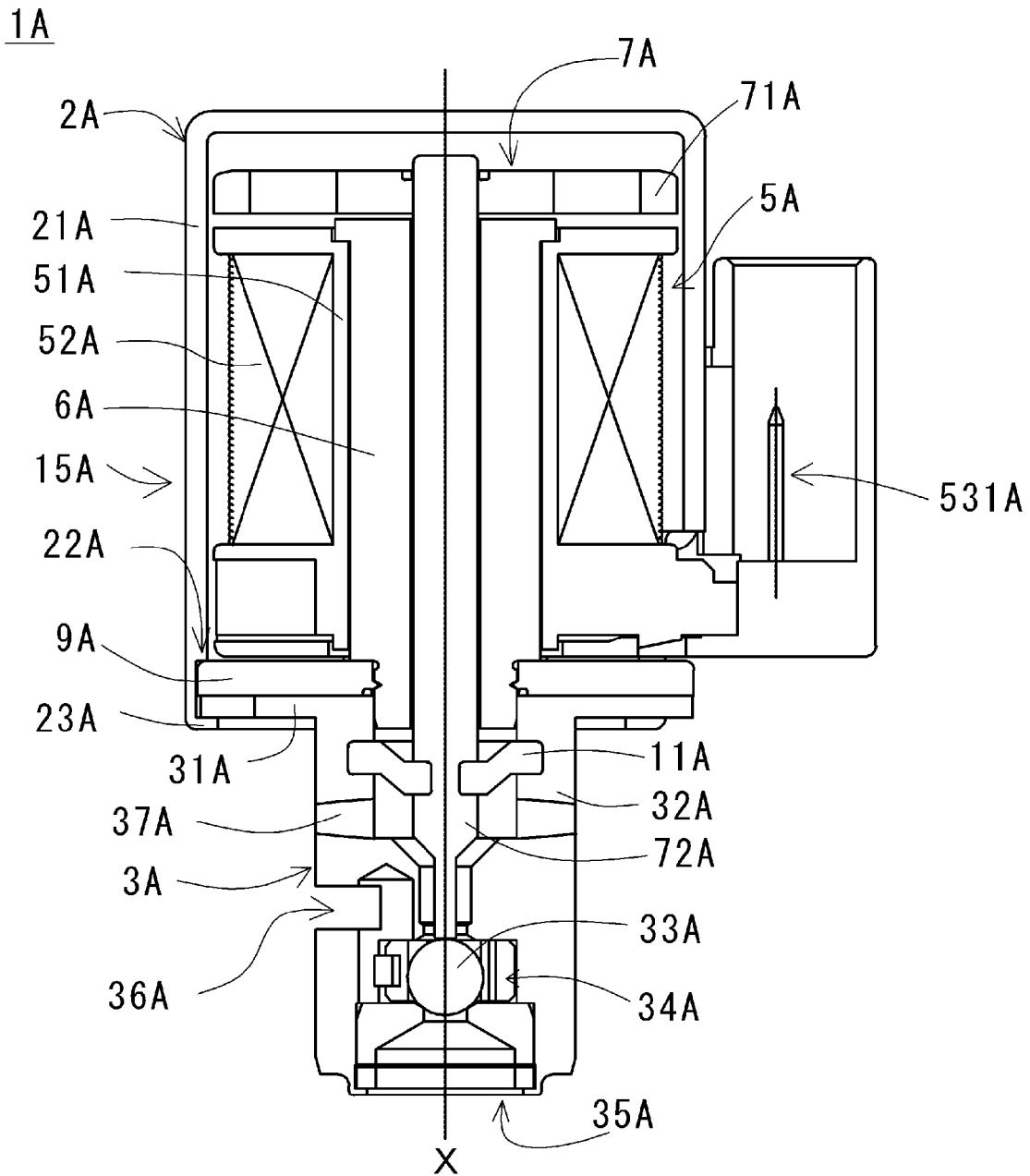
FIG. 3 is a cross-sectional view in a valve closing state of a modified example of an electromagnetic valve according to a second preferred embodiment of the present invention.
Figure 4:
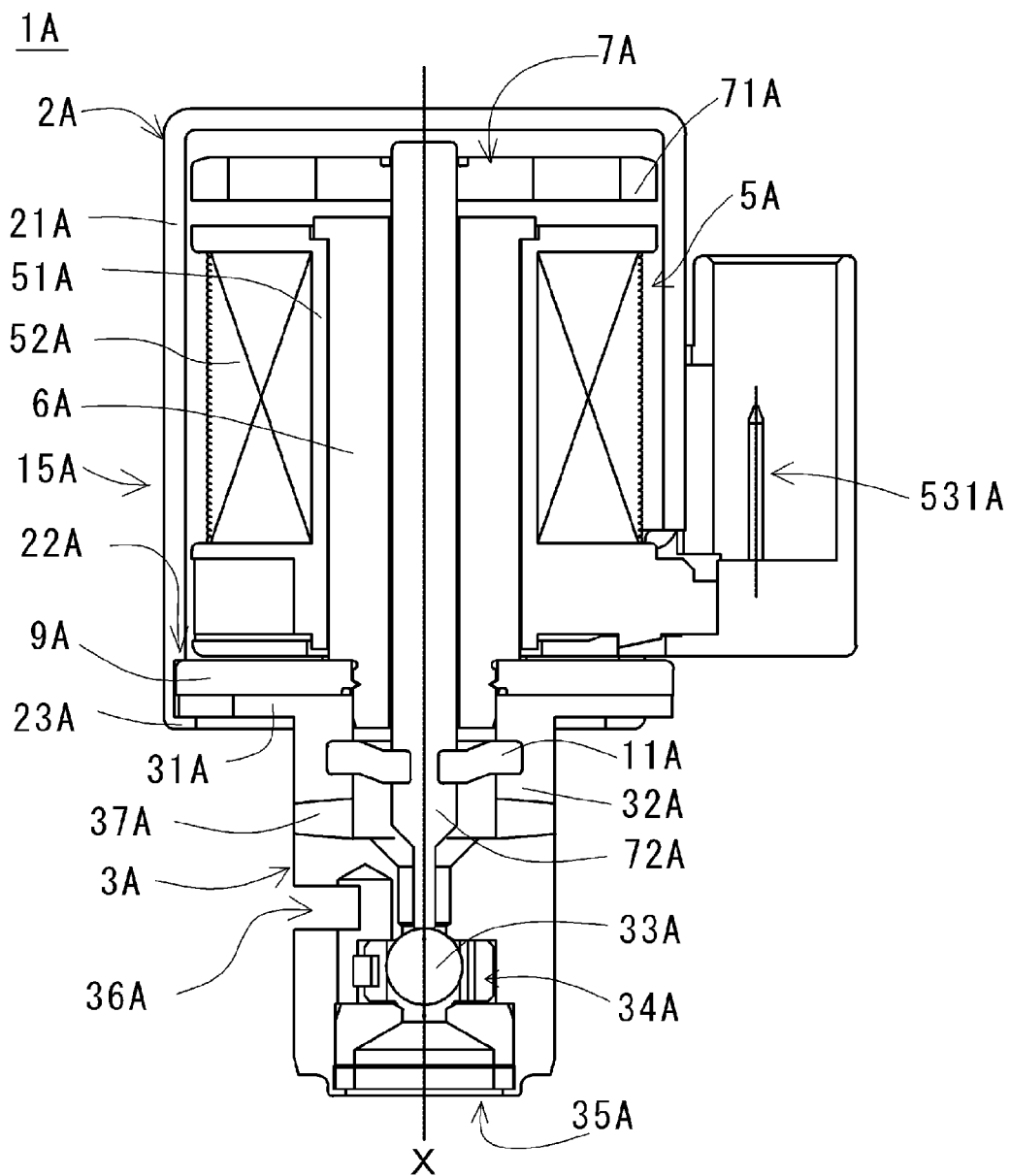
FIG. 4 is a cross-sectional view in a valve closing state of the electromagnetic valve according to the second preferred embodiment of the present invention.

FIGS. 3 and 4 are cross-sectional views of an electromagnetic valve 1A according to a second preferred embodiment of the present invention. The electromagnetic valve 1A is a device for moving a plunger 7A in the up-and-down direction. FIG. 3 shows the electromagnetic valve 1A in a valve closing state, and FIG. 4 shows the electromagnetic valve 1A in a valve opening state.

As shown in FIG. 3, the electromagnetic valve 1A according to the second preferred embodiment includes an electromagnetic movable section 15A and a nozzle 3A. The electromagnetic movable section 15A preferably includes a cover 2A, a solenoid 5A, a core 6A, the plunger 7A, and a magnet 9A.

The cover 2A of the electromagnetic valve 1A preferably includes a cylindrical portion 21A which is a magnetic body and which covers a coil 52A from the outside in the radial direction. The nozzle 3A is provided at a lower end portion of the cover 2A. Since the nozzle 3A preferably has the same structure as that in the first preferred embodiment, description thereof is omitted.

The magnet 9A having an annular shape is preferably disposed on the upper side of a disk portion 31A. Further, the magnet 9A is disposed between the core 6A and the cover 2A and is subjected to one-sided single-pole magnetization in the radial direction such that the inside in the radial direction becomes an N pole and the outside in the radial direction becomes an S pole. The magnet 9A is preferably fixed by a lower step portion 22A defined on the inner surface of the cover 2A. A lower end of the cover 2A is preferably bent inward, thus defining a lower caulking portion 23A. In this way, the magnet 9A and the disk portion 31A are sandwiched between the lower step portion 22A and the lower caulking portion 23A.

The solenoid 5A is disposed on the upper side of the magnet 9A. A bobbin 51A and the coil 52A are preferably disposed in the solenoid 5A. The bobbin 51A is a cylindrical member. The coil 52A is configured by winding a conducting wire around the bobbin 51A around the central axis X extending in the up-and-down direction. The core 6A is disposed radially inside the bobbin 51A. In other words, the core 6A includes a cylindrical portion which is fixed to the inside in the radial direction of the coil 52A, is disposed to face a magnetic body portion 71A of the plunger 7A and the central axis X, and supports the plunger 7A so as to be movable along the central axis X.

The plunger 7A is disposed radially inside the core 6A so as to be movable in the up-and-down direction along the central axis X. The plunger 7A includes the magnetic body portion 71A made of a magnetic body, and a pin 72A made of a nonmagnetic body. More specifically, the pin 72A is preferably disposed radially inside the core 6A, and the magnetic body portion 71A is preferably disposed on the upper sides in the axial direction of the core 6A and the coil 52A. Further, the pin 72A is inserted into the nozzle portion 32A. A lower end portion of the pin 72A is in contact with a valve 33A in the valve closing state. In other words, the plunger 7A is disposed radially inside the coil 52A so as to be movable in the up-and-down direction along the central axis X.

One end of the coil 52A is electrically connected to a connector 531A provided at the bobbin 51A. Further, the cover 2A is preferably cut out toward the upper side in the axial direction from the lower side in the axial direction at a position corresponding to the connector 531A, and the connector 531A is fitted into the cut-out portion.

In the electromagnetic valve 1A shown in FIG. 3, magnetic flux which is generated from the N pole on the inside in the radial direction of the magnet 9A passes through the core 6A, the magnetic body portion 71A, and the cover 2A, such that a magnetic circuit reaching the S pole on the outside in the radial direction of the magnet 9A is defined. In other words, the magnet 9A configures a magnetic circuit between the core 6A, the plunger 7A, and the cover 2A.

That is, the magnet 9A is subjected to one-sided single-pole magnetization along the magnetic circuit, and a plane which is perpendicular or substantially perpendicular to a straight line connecting the N pole and the S pole and passes through a central position between the N pole and the S pole is disposed so as not to pass through the core 6A, and therefore, the magnetic flux which is generated from the N pole easily passes through the core 6A and the magnetic body portion 71A such that the magnetic flux which is generated from the N pole of the magnet 9A is effectively utilized as a force to attract the magnetic body portion 71A of the plunger 7A to the core 6A.

A pressing member 11A is preferably disposed between the nozzle portion 32A and the pin 72A. The pressing member 11A presses the pin 72A axially downward. Further, the pressing member 11A presses the plunger 7A farther towards the lower side in the axial direction than a position where the pressing member 11A is fixed to the nozzle 3A. Further, the pressing member 11A is fixed to the plunger 7A farther towards the side where the plunger 7A is pressed by the pressing member 11A than a position where the pressing member 11A is fixed to the nozzle 3A. More specifically, the pressing member 11A is fixed to the pin 72A farther towards the side where the pin 72A is pressed by the pressing member 11A than a position where the pressing member 11A is fixed to the nozzle portion 32A. In this way, the movement of a fluid towards the electromagnetic movable section 15A is prevented and maintenance of the valve closing state becomes possible. Further, the pressing member 11A is fixed to the plunger 7A farther towards the side where the plunger 7A is pressed by the pressing member 11A than a position where the pressing member 11A is fixed to the nozzle 3A, such that the pressing member 11A more strongly presses the plunger 7A, compared to a case where a position where the pressing member 11A is fixed to the nozzle 3A side and a position where the pressing member 11A is fixed to the plunger 7A side are the same in the axial direction. The pressing member 11A is preferably, for example, a diaphragm. Further, the position where the pressing member 11A is fixed to the nozzle 3A side is positioned farther towards the upper side than a drain port 37A. In other words, the nozzle 3A includes the drain port 37A at a position penetrating radially outward farther towards the valve chamber 34A side than a site to which the pressing member 11A is fixed.

The magnet 9A is disposed radially outside an attractor 6A, such that, compared to a case where the magnet 9A is disposed radially outside the magnetic body portion 71A, the magnetic body portion 71A is prevented from moving in the up-and-down direction with it shifted in the radial direction from the central axis X. That is, this is because a magnetic attractive force between the attractor 6A and the magnetic body portion 71A becomes equal or substantially equal in a case where the magnet 9A is disposed radially outside the attractor 6A and a case where the magnet 9A is disposed radially outside the magnetic body portion 71A, but, in terms of a magnetic attractive force to the outside in the radial direction of the magnetic body portion 71A, the magnetic attractive force becomes smaller in a case where the magnet 9A is disposed radially outside the attractor 6A. The reason is because, in a magnetic circuit, a distance from the magnet 9A to the side surface in the radial direction of the magnetic body portion 71A becomes larger in a case where the magnet 9A is disposed radially outside the attractor 6A, compared to a case where the magnet 9A is disposed radially outside the magnetic body portion 71A. If the distance from the magnet 9A to the side surface in the radial direction of the magnetic body portion 71A becomes large, it means that a plurality of members are disposed in a magnetic circuit from the magnet 9A to the magnetic body portion 71A. Due to the influence of the magnetic reluctance of each member or magnetic reluctance between the respective members, an attractive force in the radial direction to the magnetic body portion 71A, which is given by the magnetic flux of the magnet 9A, becomes smaller in a case where the magnet 9A is disposed radially outside the attractor 6A, compared to a case where the magnet 9A is disposed radially outside the magnetic body portion 71A. If the magnetic body portion 71A moves in the up-and-down direction with it shifted in the radial direction from the central axis X, the attractor 6A or the magnetic body portion 71A is shaved by other portions of the electromagnetic valve 1A, and thus there is a concern that contamination may occur. The contamination is accumulated between the magnetic body portion 71A and the attractor 6A, such that the movement in the up-and-down direction of the plunger 7A is impeded. If the movement in the up-and-down direction of the plunger 7A is impeded due to the accumulation of the contamination, the responsiveness of the electromagnetic valve deteriorates, and in the worst case, the movement is completely impeded, and thus a function as an electromagnetic valve is lost. In the structure in the second preferred embodiment, such a concern decreases.

In the electromagnetic valve 1A according to the second preferred embodiment, the magnetic body portion 71A faces the cover 2A in the radial direction with a nonmagnetic body interposed therebetween. In this preferred embodiment of the present invention, the nonmagnetic body is preferably air, for example. In such a structure, magnetic reluctance between the magnetic body portion 71A and the cover 2A becomes large. For this reason, a magnetic attractive force in the radial direction between the magnetic body portion 71A and the cover 2A is significantly reduced, and therefore, the magnetic body portion 71A is further prevented from being shifted in the radial direction from the central axis X.

The second preferred embodiment of the present invention has been described above. However, the present invention is not limited to the above-described preferred embodiment.

Figure 7A:
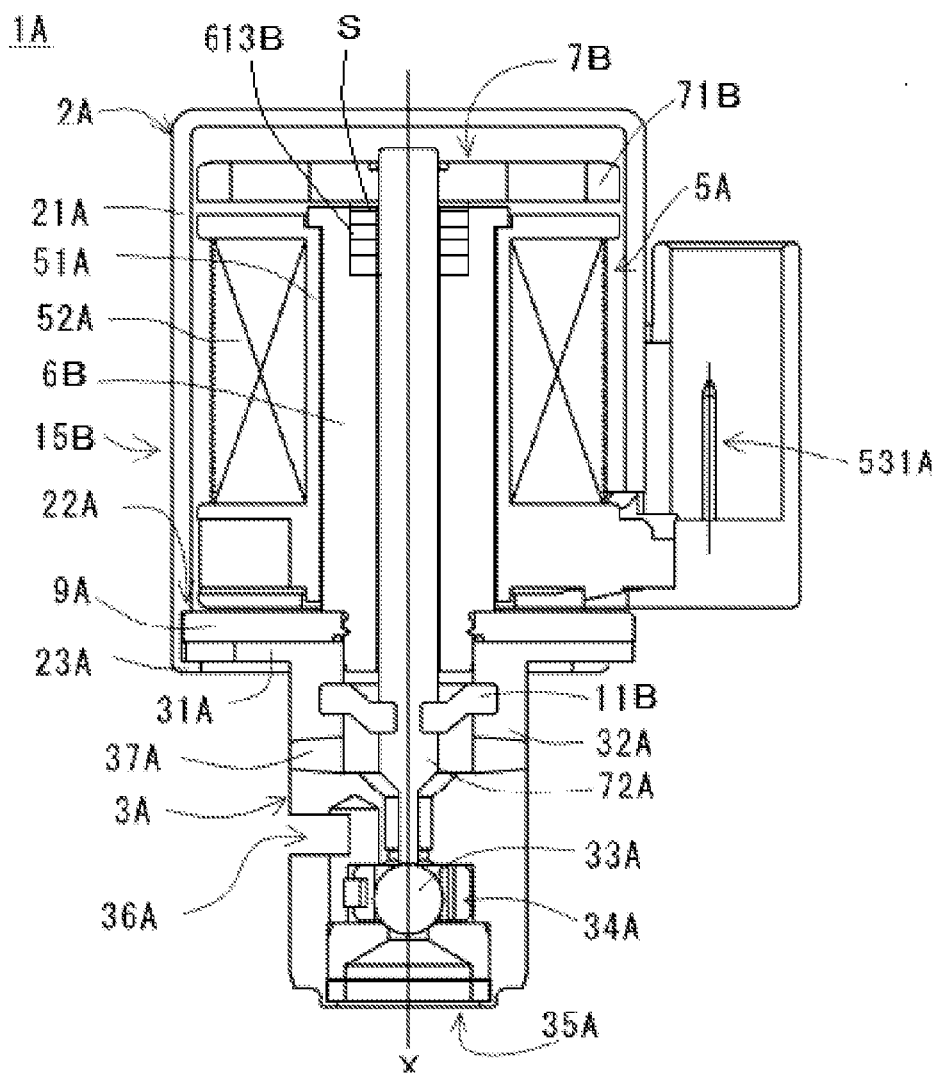
FIGS. 7A and 7B are cross-sectional views of the electromagnetic valve according to yet another preferred embodiment of the present invention.
Figure 7B:
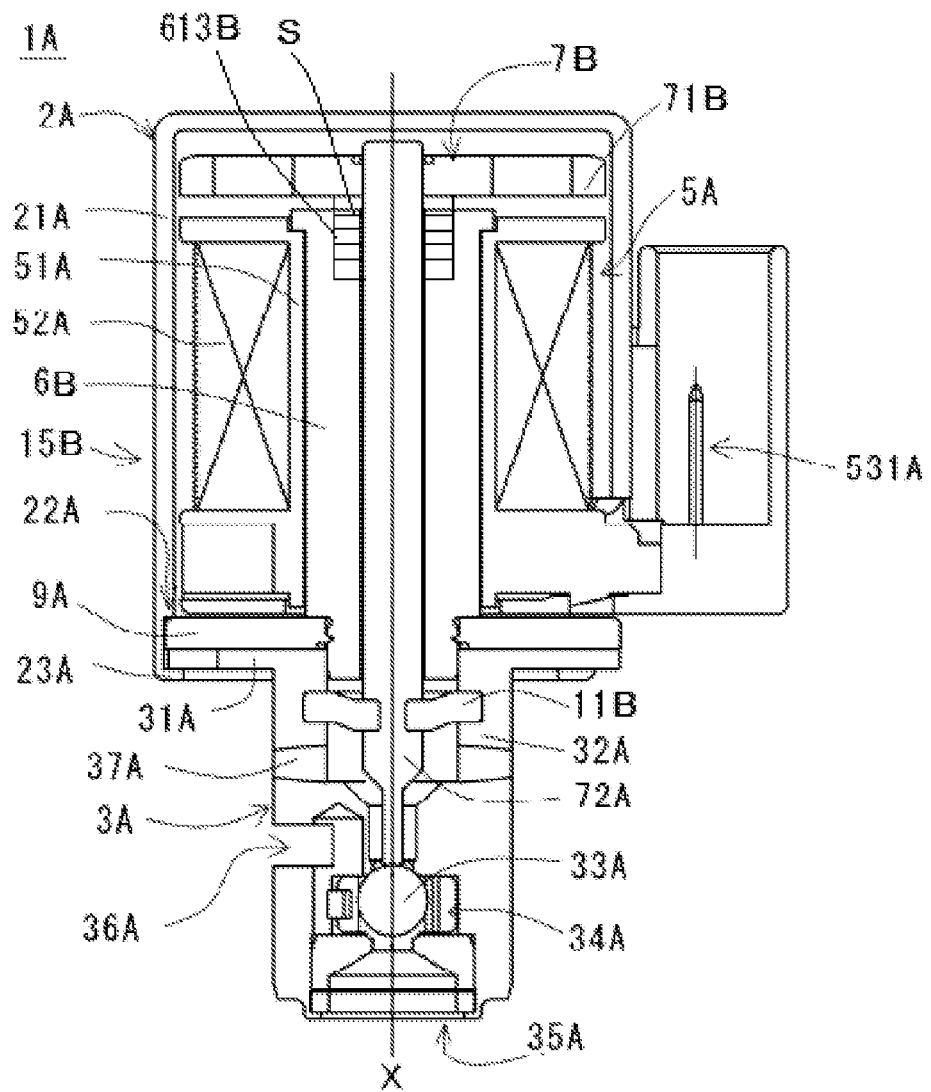

In the second preferred embodiment, the plunger 7A is preferably pressed downward by the pressing member 11A. However, in addition to the pressing member 11A, a spring (S, as shown in FIGS. 7A and 7B) may also be used if so desired. In a case where the spring is also used together therewith, the spring is disposed in an accommodation portion 613B of a core 6B. The accommodation portion 613B is an upward opened depression of the core 6B. The spring is in contact with each of the bottom surface of the accommodation portion 613B and the lower surface of a magnetic body portion 71B. Due to this configuration, the magnetic body portion 71B is pressed by the spring in a direction axially away from the core 6B. If the spring is disposed in this manner and a pressing member 11B and the spring are used together, compared to the related art, a pressing force of the spring can be reduced by the extent that a plunger 7B is pressed by the pressing member 11B. As a result, it is possible to make the spring small, and thus a reduction in the size of an electromagnetic movable section 15B is achieved.

Further, the shapes of details of each member may be different from the shapes shown in each drawing of this application. For example, the annular magnet 9 may be a magnet made by arranging a plurality of magnet segments into an annular shape. Further, the respective elements appearing in the above-described preferred embodiments or a modified example may be appropriately combined to the extent that contradiction does not occur.

While preferred embodiments of the present invention and modifications thereof have been described above, it is to be understood that variations and modifications will be apparent to those skilled in the art without departing from the scope and spirit of the present invention. The scope of the present invention, therefore, is to be determined solely by the following claims.

What is claimed is:

1. An electromagnetic valve comprising:
an electromagnetic movable section; and
a nozzle, wherein
the electromagnetic movable section includes:
    a coil made of a conducting wire wound about a bobbin around a central axis extending in an up-and-down direction;
    a plunger, which is directly or indirectly supported with respect to the coil so as to be movable in the up-and-down direction along the central axis radially inside the coil, protrudes to the nozzle side, and includes a magnetic body portion;
    a core which is fixed to an inside in a radial direction of the coil, is disposed to face the magnetic body portion of the plunger in a direction of the central axis, and is a magnetic body;
    a cover including a cylindrical portion which covers the coil from an outside in the radial direction and is a magnetic body;
    an annular magnet defining a magnetic circuit between the core, the plunger, and the cover; and
    a spring that presses the plunger relative to the core in a direction repelling a force by which the magnetic body portion of the plunger is magnetically attracted to the core due to an influence of a magnetic field of the magnet; wherein
the nozzle is disposed axially below the electromagnetic movable section and includes an inlet-port, an outlet-port, a valve that contacts a lower end portion in an axial direction of the plunger, and a valve chamber accommodating the valve;
the inlet-port communicates with the valve chamber;
the outlet-port communicates with the valve chamber in a direction different from the inlet-port;
the valve moves in the axial direction in the valve chamber so as to perform opening and closing between the inlet-port and the valve chamber;
a pressing member is fixed farther towards the electromagnetic movable section side than the valve chamber in the nozzle;
the pressing member presses the plunger farther towards a lower side in the direction of the central axis than a position where the pressing member is fixed to the nozzle;
an inner peripheral surface of the magnet which is disposed below the coil and in which each of the inner peripheral surface and an outer peripheral surface is subjected to one-sided single-pole magnetization in the radial direction is in contact with an outer peripheral surface of the core; and
the outer peripheral surface of the magnet is in contact with the inner peripheral surface of the cover.

2. The annular magnet according to claim 1, wherein the annular magnet is disposed between the core and the cover and is subjected to one-sided single-pole magnetization in the radial direction such that the inside in the radial direction and the outside in the radial direction.

3. The electromagnetic valve according to claim 1, wherein the pressing member is fixed to the plunger farther towards a side where the plunger is pressed by the pressing member than the position where the pressing member is fixed to the nozzle.

4. The electromagnetic valve according to claim 1, wherein the plunger includes a nonmagnetic body portion at a location in the nozzle.

5. The electromagnetic valve according to claim 1, wherein the valve is a nonmagnetic body.

6. The electromagnetic valve according to claim 1, wherein the nozzle is a nonmagnetic body.

7. The electromagnetic valve according to claim 1, wherein the nozzle includes a drain port penetrating radially outward farther towards the valve chamber side than a location at which the pressing member is fixed.

8. The electromagnetic valve according to claim 1, wherein the magnetic body portion is accommodated in the cover.

9. The electromagnetic valve according to claim 1, wherein
the magnetic body portion of the plunger includes a concave portion which is opened toward an upper side in the axial direction;
the spring is accommodated radially inside the concave portion;
an upper end of the concave portion faces the core in the axial direction; and
the nonmagnetic body portion is fixed to a bottom portion of the concave portion.

10. The electromagnetic valve according to claim 9, wherein the core includes an attractor facing the magnetic body portion in the axial direction and a bush facing the magnetic body portion in the radial direction.

11. The electromagnetic valve according to claim 10, wherein the electromagnetic movable section includes a yoke;
the cover includes a cylindrical portion which covers the coil from outside in the radial direction; and
the yoke magnetically connects the cylindrical portion and a plunger supporting portion axially below the coil.

12. The electromagnetic valve according to claim 1, wherein
the core includes an annular accommodation portion recessed downward from the upper end;
a lower end of the spring contacts a bottom surface of the accommodation portion; and
a lower area of the spring is accommodated in the accommodation portion.

13. The electromagnetic valve according to claim 1, wherein
the core includes an upper core and a lower core;
the magnet in which each of an upper surface and a lower surface is subjected to one-sided single-pole magnetization in the axial direction is disposed between a lower surface of the upper core and an upper end of the lower core; and
an outer peripheral surface of the lower core and the cover are in contact with each other.

14. The electromagnetic valve according to claim 11, wherein the cover includes:
the cylindrical portion which covers the coil from the outside in the radial direction; and
a bottom portion which magnetically connects the cylindrical portion and a lower core axially below the coil.

* * * * *